United States Patent [19]

McConnell et al.

[11] Patent Number: 4,719,837
[45] Date of Patent: Jan. 19, 1988

[54] COMPLEX SHAPED BRAIDED STRUCTURES

[75] Inventors: Ronald F. McConnell, West Chester, Pa.; Peter Popper, Wilmington, Del.

[73] Assignee: E. I. DuPont De Nemours and Company, Wilmington, Del.

[21] Appl. No.: 853,742

[22] Filed: Apr. 17, 1986

[51] Int. Cl.[4] ............... D04C 1/06; D04C 3/00
[52] U.S. Cl. .................................. 87/1; 87/5; 87/7; 87/8; 87/11; 87/28; 87/30; 87/33; 156/148; 428/225; 428/245
[58] Field of Search .................................. 87/5–8, 87/1, 11, 28, 30, 33, 34; 139/11, 13 R, 16; 156/148; 428/224–226, 245–255

[56] References Cited

U.S. PATENT DOCUMENTS

| | | | |
|---|---|---|---|
| 3,426,804 | 2/1969 | Bluck | 139/11 |
| 4,312,261 | 1/1982 | Florentine | 87/33 |
| 4,614,147 | 9/1986 | Vendramini | 87/5 |
| 4,621,560 | 11/1986 | Brown et al. | 87/8 |

FOREIGN PATENT DOCUMENTS

0113196  7/1984  European Pat. Off. .

Primary Examiner—John Petrakes

[57] ABSTRACT

A complex braided composite structure is formed of axial and braiding yarns using an interlacing pattern which allows all braiding yarn reversals to occur outside a multi-layer array of axial yarns concurrently at one location in the pattern thus allowing free manipulation of the yarns for forming complex shapes.

12 Claims, 19 Drawing Figures

COMPLEX SHAPED BRAIDED STRUCTURES

BACKGROUND OF THE INVENTION

This invention relates to complex shaped structures and more particularly it relates to three dimensional braided structures of a structural composite material.

Fiber-reinforced plastic structures have been used for many years with increasing success because of their high strength, light weight and ease of fabrication compared to the wood or metal structures which they replace. Fibers such as glass, carbon, ceramic and aramid are popular as reinforcement, and thermosetting as well as thermoplastic resins are common polymeric matrices.

Polymeric materials reinforced with continuous filaments are used as precursors for highly-stressed parts such as aerospace components requiring the highest possible strength and stiffness with the lowest possible weight. Non-uniformity of such parts requires that the parts be over-constructed so that the weakest will surpass the service requirements. Integral manufacture of complex structures could improve uniformity of the reinforcing material and reliability of the composite part made from such structures.

Braiding with axial yarns is one process for producing such structures and generally comprises forming an array of axial yarns extending substantially parallel to the axis of the structure and interlacing braiding yarns in a pattern through the array so they are interlaced with one another and with the axial yarns. Known processes for doing this, such as described in European patent publication No. 0113196, do not lend themselves to forming complex shaped structures at relatively high processing speeds and it would be highly desirable to do so.

SUMMARY OF THE INVENTION

This invention, through a unique braiding pattern, allows manipulation of the yarns to form complex shaped structures with precise yarn placement at relatively high processing speeds. The method of forming such structures includes moving the braiding yarns in a repeating two-step pattern such that the braiding yarns follow diagonal paths through a multi-layer axial array of yarns that extend longitudinally in the structure. Each of the braiding yarns pass completely through the array before reversing at a point outside of the array then moving in another diagonal direction. All braiding yarns are outside the array at their reversal points simultaneously. The product formed is defined in terms of the braiding yarns and axial yarns. The improvement is in the interlacing pattern wherein each of said braiding yarns extend in diagonal paths completely through the array to the outer periphery of the structure before any of said braiding yarns extend in a path in another diagonal direction from their reversal point. The arrangement of yarns provides directional reinforcement and structural shape with a relatively small number of braiding yarns.

A matrix material may be added to any of the structures made by this invention to form a rigid composite. For example, a three-dimensional braided structure can be shaped as a T-beam and rigidized to form a structural member.

BRIEF DESCRIPTION OF THE DRAWINGS

FIG. 2d, 2e are end view projections showing the braiding yarn paths for the structure of FIG. 2a.

DETAILED DESCRIPTION OF THE PREFERRED EMBODIMENTS

Figure 1:
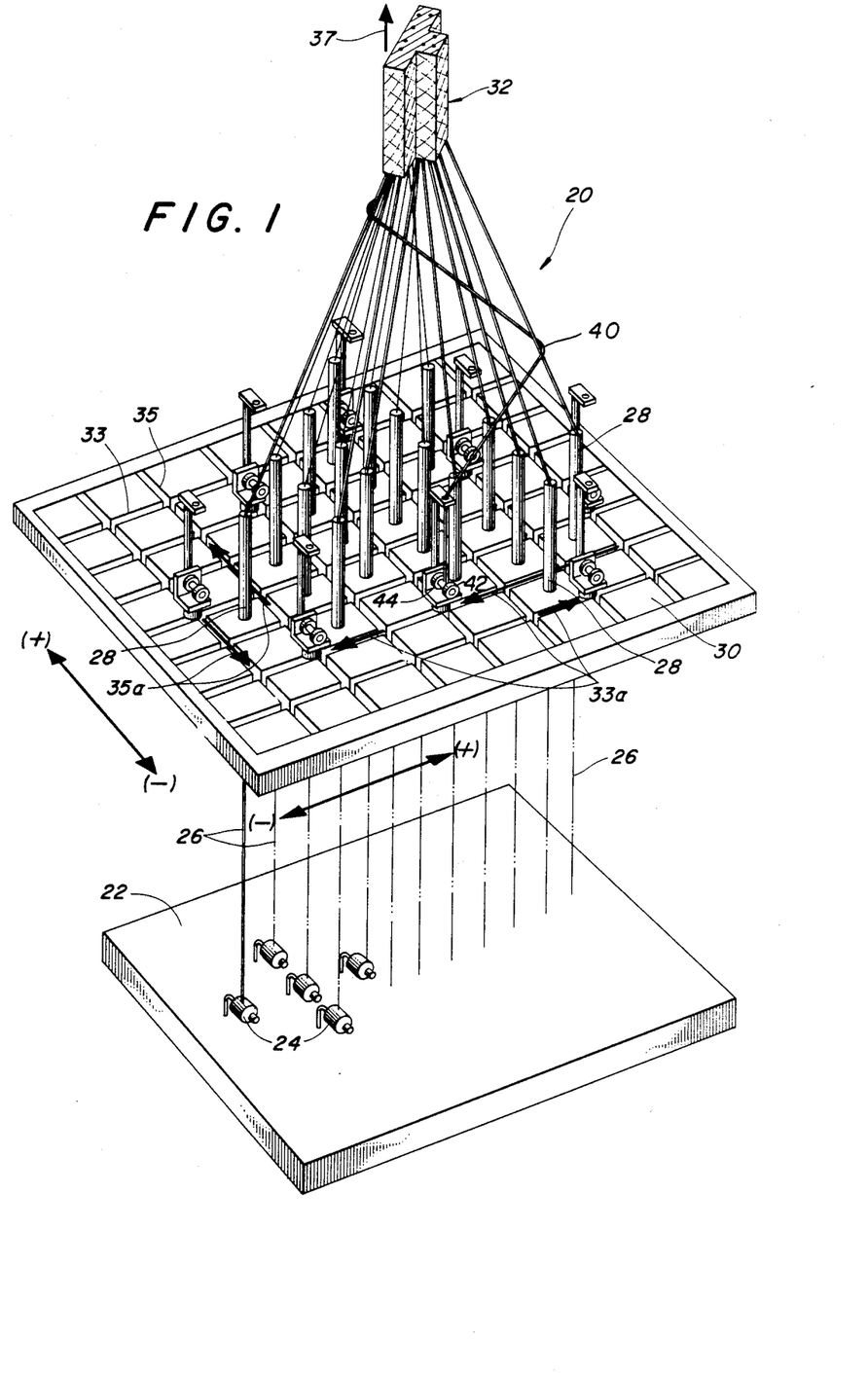
FIG. 1 is a schematic view in perspective of the braiding apparatus useful for the invention.
Figure 2A:
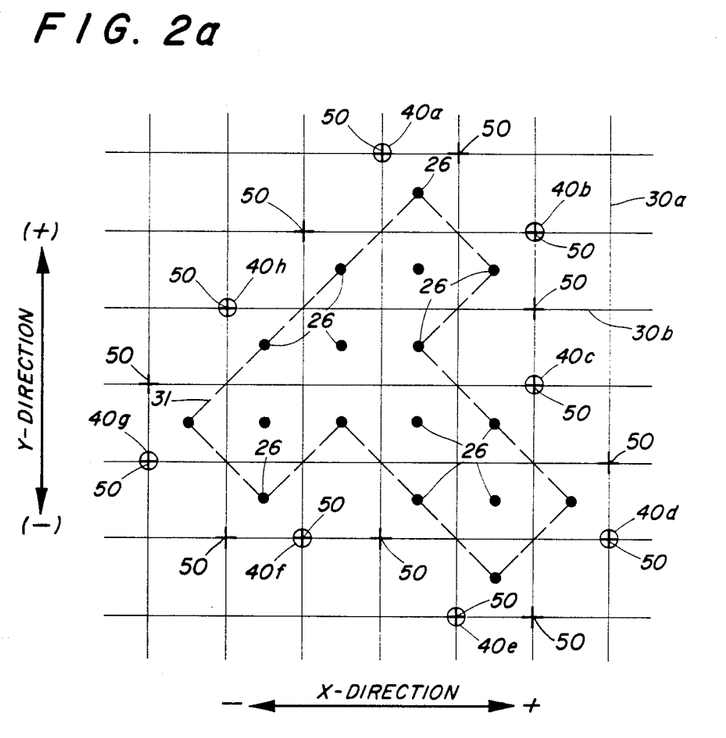
FIG. 2a, 2b, 2c are a series of motion diagrams showing the progressive braiding steps for forming a T-beam.
Figure 2B:
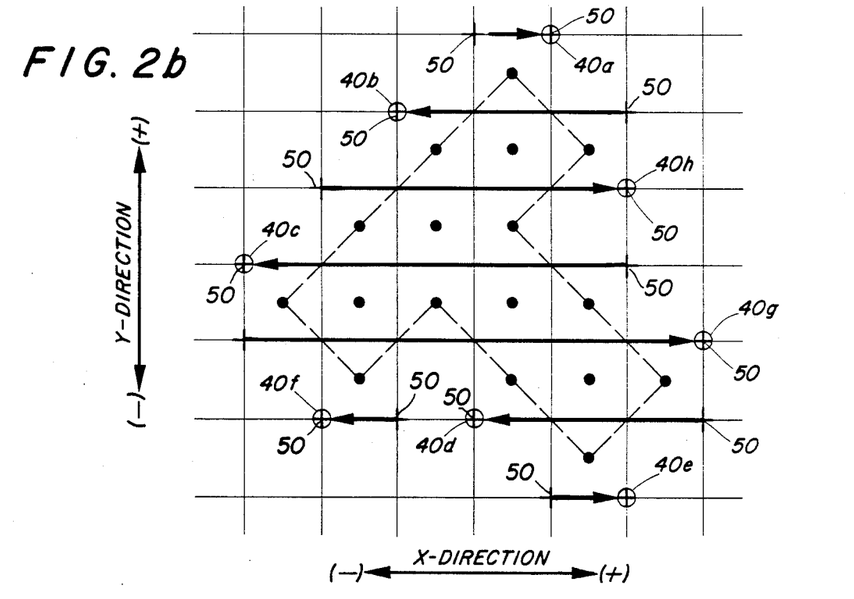
Figure 2C:
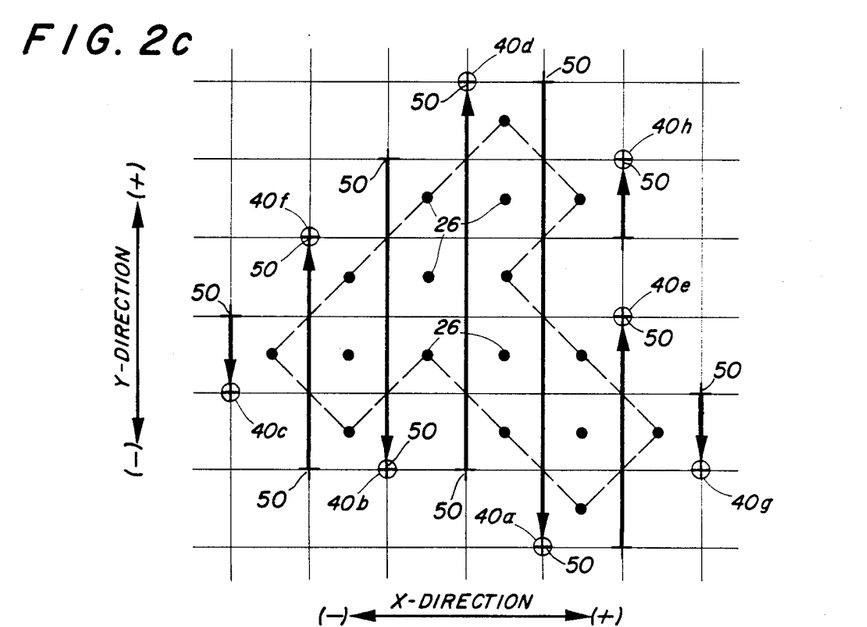

The braided structures of this invention are preferably made on an apparatus such as that schematically shown in FIG. 1 wherein a two-step motion as shown in FIGS. 2a–2c is used to interlace braiding yarns with axial yarns and with each other in a pattern to obtain the benefits of the invention. Referring now to FIG. 1, a braiding machine generally designated 20 is fed from a creel 22 supporting supply packages 24 of yarns 26 which are moved through guide tubes 28 in grid support 30 in a multi-layer array. The yarns 26 are referred to as axial yarns and they extend substantially parallel to the longitudinal axis of the T structure 32 being formed by the braiding operation. Braiding yarns 40 (only one shown) are fed from supply packages 42 mounted on carriers 44 (such as model KL80B mfg. by Steeger, Inc.) which are movable in grid support 30 in the X and Y directions along grooves 33,35 in the support 30 by means of positive acting drives indicated by arrows 33a, 35a in a pattern to be described later in connection with FIGS. 2a through 2e. In FIG. 1, carriers 44 are shown at selected reversal points in a pattern for forming the T-shaped structure 32. Braiding motion is accomplished by moving the carriers through the axial yarn array first along selected X grooves 33 of the grid and subsequently along selected Y grooves 35 of the grid. The continuous repetition of these two X and Y steps combined with an axial advance of the structure 32 provided by puller mechanism indicated by the arrow 37 forms three dimensional braided structures of complex geometry, such as the braided T-beam structure 32.

Figure 2D:
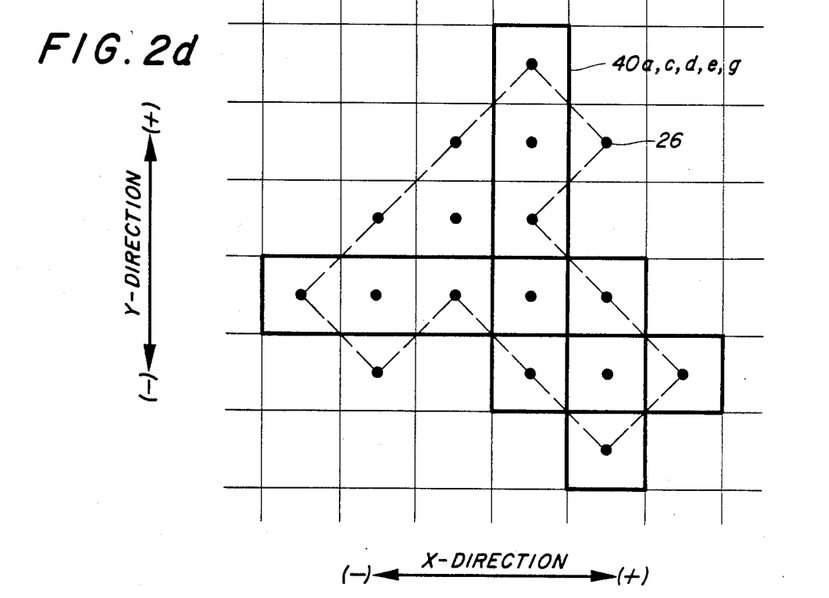
Figure 2E:
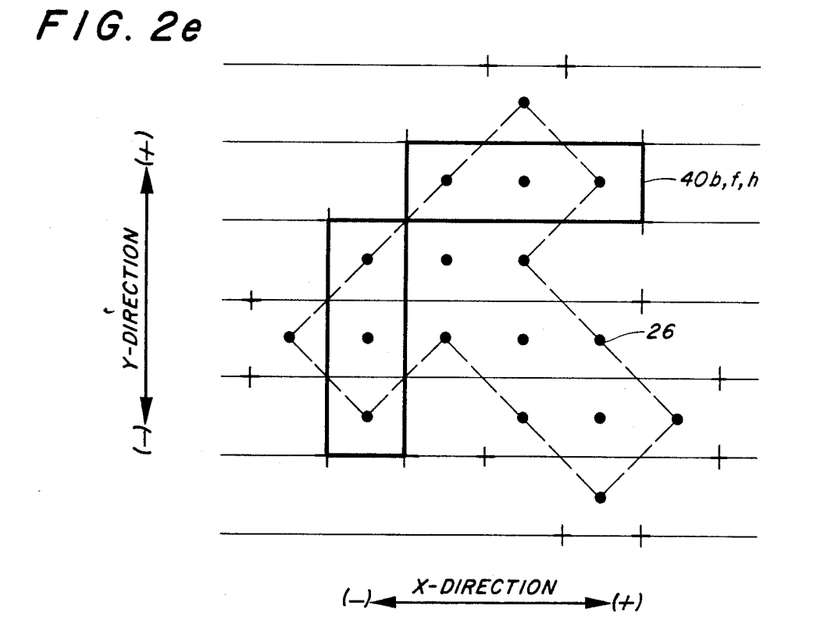

Referring now to FIG. 2a, axial yarns 26 are arranged in the grid 30 in the geometric shape 31 of a T-beam. Braiding yarns 40 are placed at alternating reversal points 50. There are eight (8) braiding yarns shown and designated 40a through 40h. These are positioned at alternating reversal points in both the X and Y directions of the grid. In the first step of the braiding operation each of the yarns 40a through 40h are moved in either the plus (+) or minus (−) direction as indicated by the arrows or displacement vectors through the array of axial yarns 26 (FIG. 2b) to the first empty reversal point 50, i.e., 40a, 40h, 40g and 40e move in the plus (+) direction while 40b, 40c, 40d, and 40f move in the minus (−) direction. The second step of the braiding operation moves the braiding yarns orthogonally in either the X or Y direction as shown by the arrows or displacement vectors in FIG. 2c to the first empty reversal point, i.e., 40d, 40e, 40f and 40h move in the plus (+) direction while 40a, 40b, 40c and 40g move in the minus (−) direction. The pattern by which yarns 40a, 40e, 40c, 40g and 40d interlace the axial array of yarn 26 is shown in FIG. 2d. The pattern by which yarns 40b, 40f and 40h interlace the axial yarns is shown in FIG. 2e. The motion patterns described for making a T-beam can be generalized for making any cross-sectional shape as follows:

Position the axial yarns in a geometric array on an orthogonal grid where each axial yarn 26 is placed in the center of a grid unit. Although any shaped outline can be selected, the arrangement of axial yarns is limited to those in which a boundary line connecting the centers of the boundary axial yarns must be made exclusively of line segments which are ±45° to the grid lines in the X and Y directions. See for example the boundary line 31 on FIG. 2a. Note that multi-boundary shaped structures such as those in FIG. 8 can also be selected.

Identify the reversal points at the crossing points of the gridlines nearest the axial yarns but outside the boundary line within the distance of one grid unit. These are designated 50 in FIG. 2a.

Locate the braiding yarns at alternate reversal points along the boundary starting with the lowest X reversal point in the lowest Y row, designated as the pivotal braider. For multi boundary structures alternate braiding yarns so that the first machine motion provides an empty space for each yarn. These are designated 40a through 40h in FIG. 2a. The pivotal braider is 40e.

Move Braiding Yarns For step one of the braiding motion, move all braiding yarns simultaneously in the X direction to the nearest empty reversal point alternating plus or minus with every Y row where the row including the pivotal braider moves in the plus direction. For step two of the braiding motion, move all braiding yarns simultaneously in the Y direction to the nearest empty reversal point alternating plus or minus with every X row where the row including the pivotal braider moves in the plus direction. For purposes of this disclosure, this motion is defined as moving through the array. Continue the process by repeating step one and step two of the braiding motion while advancing the structure axially. All reversals of braiding yarn movement occur simultaneously when the braiding yarns are outside the axial array.

Figure 7:
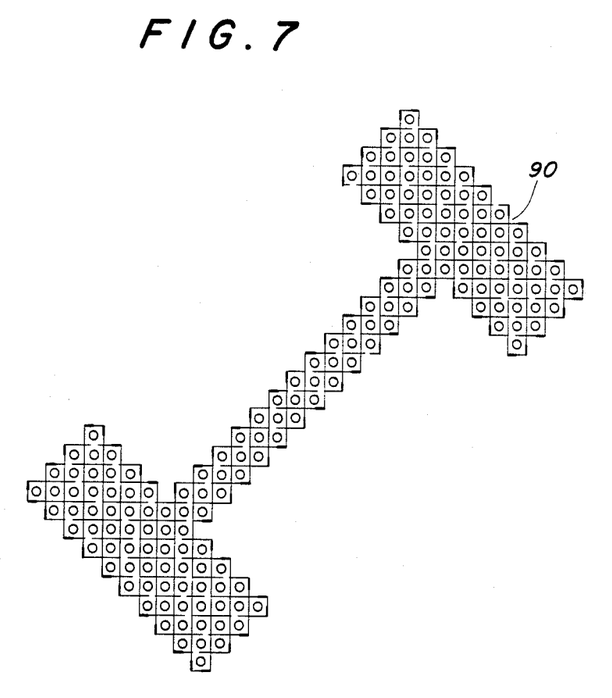
FIG. 7 is a motion diagram of an I-beam structure with varying wall thickness.
Figure 8:
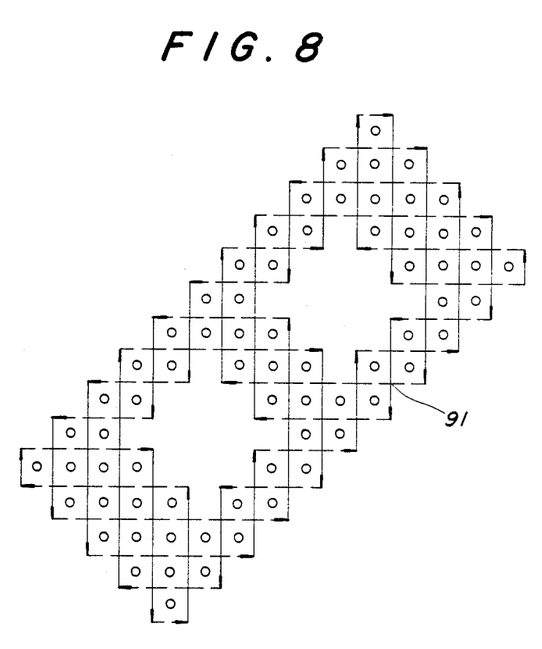
FIG. 8 is a motion diagram of a double box beam structure.
Figure 9:
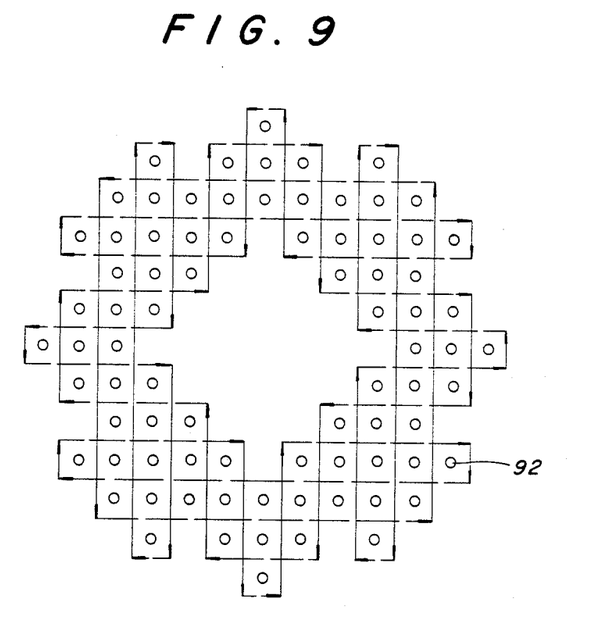
FIG. 9 is a motion diagram of a pseudo circular structure.
Figure 10:
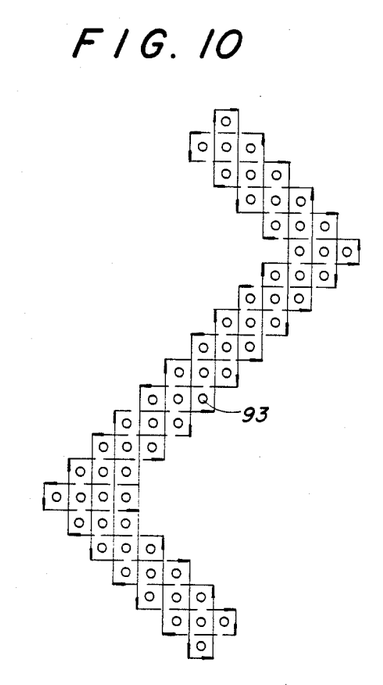
FIG. 10 is a motion diagram of a Z-beam structure with constant wall thickness.

FIGS. 7-12 illustrate a variety of cross-sectional shapes which can be made using the principles of this invention. Each figure shows the required two steps of braider motion. Dotted lines indicate the first step (or X direction movement) used to produce the structures. Solid lines indicate the second step (or Y direction movement used). More particularly, FIG. 7 is a motion diagram of an I-beam 90 with varying wall thickness; FIG. 8 is a motion diagram of a box beam structure 91; FIG. 9 is a motion diagram of a pseudo-circular structure 92; and FIG. 10 is a motion diagram of a Z-beam structure 93.

Figure 11:
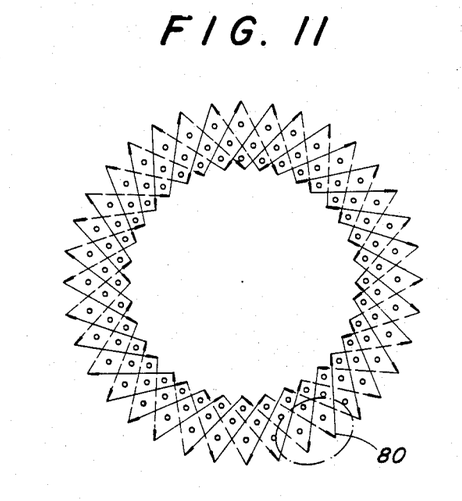
FIG. 11 is a motion diagram of a tubular structure.
Figure 11A:
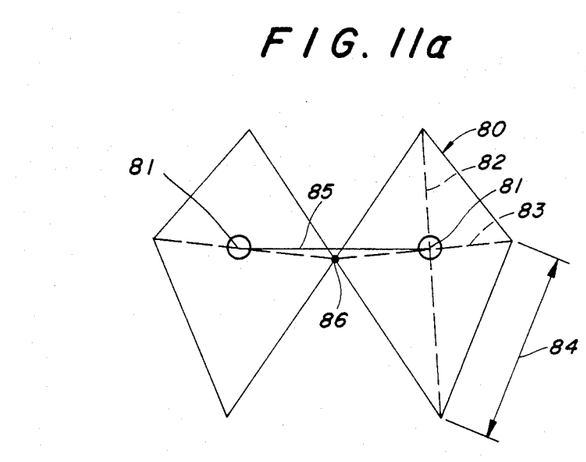
FIG. 11a is an enlarged portion of FIG. 11 illustrating the relationship of grid elements.
Figure 12:
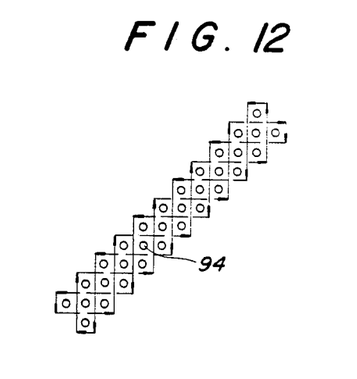
FIG. 12 is a motion diagram of a rectangular beam structure of constant thickness as described in Example II.

The braiding motions described above can be further generalized to non-orthogonal grids in which grids of any quadrilateral shaped element can be used, for example, FIG. 11 shows a tubular structure formed using two-step principles but laid out on a non-orthogonal grid. More particularly, referring to FIG. 11a the center 81 of the grid element 80 is defined as the point where internal diagonals 82,83 intersect. A unit grid spacing is defined as the length of the longest side 84 of the quadrilateral on its boundary. Line segments which connect the center of the boundary axials 81 must be along the diagonals to the grid. Diagonals 85 of the grid are defined as lines which connect the centers of grid elements with a common vertex 86.

Figure 3:
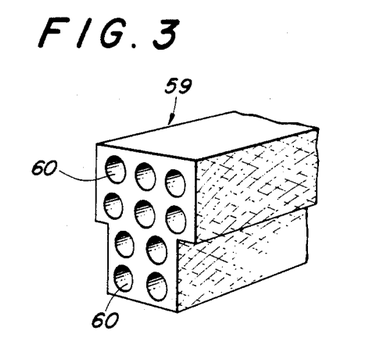
FIG. 3 is a schematic isometric view of a T-beam structure with structural voids.
Figure 3A:
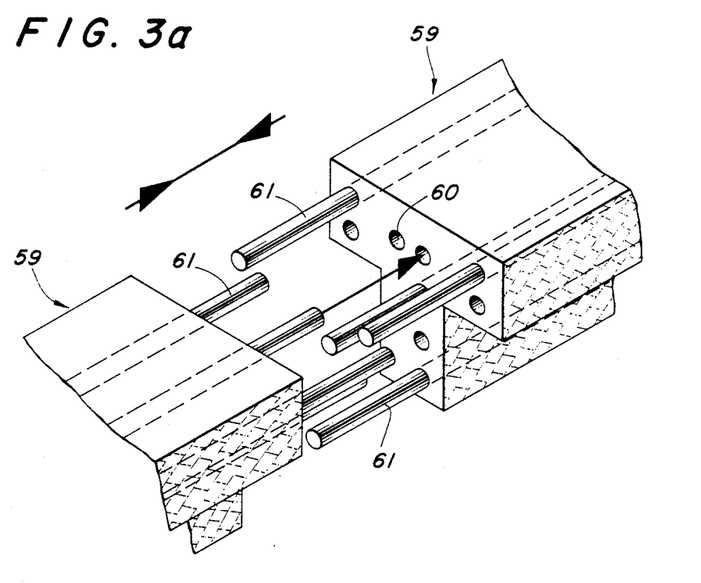
FIG. 3a is a schematic view in perspective of a joint for structures as shown in FIG. 3.

A number of structural variations may be achieved by techniques other than varying the braiding pattern. More particularly, in FIG. 3 a T-beam structure 59 with structural voids 60 is shown. This structure is produced using the same principles as outlined above except that rubber rods are substituted for some axial yarns and later removed after formation and consolidation. Structural voids increase the stiffness per weight of these beams. In addition, these voids provide useful connectors as shown on FIG. 3a. Dowels 61 may be cemented into voided areas and mated with like structures also having voids.

Figure 1A:
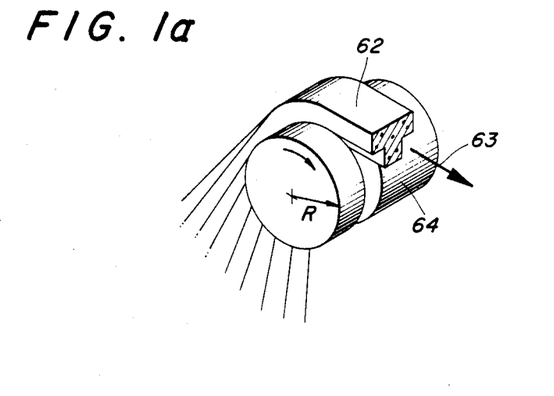
FIG. 1a is a schematic view of a section of a bent beam being formed.
Figure 4:
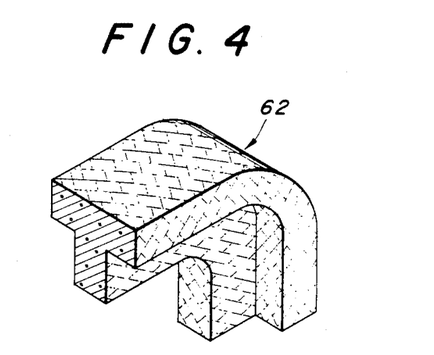
FIG. 4 is a schematic isometric view of a bent beam structure.

A bent beam structure 62 as shown in FIG. 4 is produced using the same principles and the apparatus of FIG. 1a. In FIG. 1a the output of the braiding apparatus is pulled over a surface 64 having a radius R in the direction of arrow 63 so that yarns on the outside of the bend are introduced into the structure at a greater rate than those on the inside thus forming a curved section.

Figure 5:
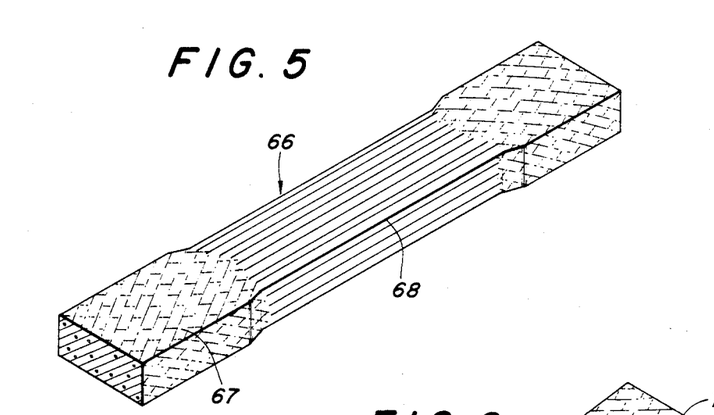
FIG. 5 is a schematic isometric view of a structural beam with lengthwise variations.

A structural beam 66 with lengthwise variations as shown in FIG. 5 can be produced by changing the speed of the puller mechanism (not shown). As illustrated, high braiding angles are formed in sections 67 of the beam by operating the movement of the puller mechanism at a relatively slow rate. Lower braiding angles are effected in section 68, e.g., approaching a parallel relationship with the axial yarns by operating the movement of the puller mechanism at a relatively fast rate. A beam with braided ends can be drilled readily at its ends to form strong attachment points.

Figure 6:
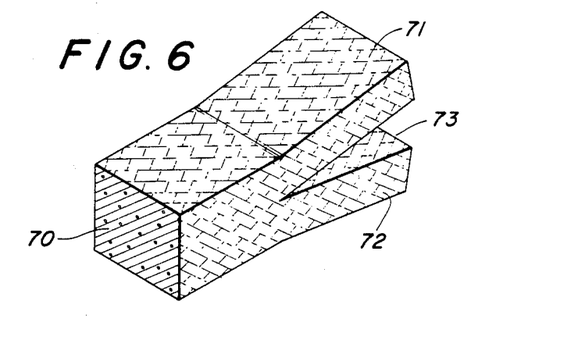
FIG. 6 is a schematic isometric view of bifurcated beam structure.

A bifurcated structure as illustrated in FIG. 6 may be produced using this invention. The braiding apparatus is initially set up to make a rectangular array 70. After a series of moves, the axial yarns are repositioned to form two rectangular areas 71 and 72 separated by a space 73. The structure changes in cross section along its length.

EXAMPLE I

A T-beam structure is prepared by providing 27 groups of axial yarns of 7,200 denier carbon fiber (AS-4 made by Hercules, Inc.) and 12 groups of braiding yarns of 15,000 denier Kevlar ® aramid fiber. The axial yarns groups include 16 yarn ends in each of the 15 groups of the flange portion and eight yarn ends in each of 12 groups of the web portion. The braiding yarn groups each have two yarn ends. The braided structure is prepared by the two-step motion detailed above. The braided structure is removed from the braiding apparatus and consolidated by impregnating the structure with an epoxy resin (EPON®815, mfg. by Shell Chemical Company). The impregnation involves dipping the braided structure in the resin and/or injecting the resin into the braided structure with a large hypodermic needle. The structure is exposed to vacuum to remove any air pockets. The impregnated structure is placed in a T-shape mold and mechanical pressure of approximately 50 psi is applied while heating the mold to a temperature of about 120° F. for two hours. Then the mold is allowed to cool to room temperature under pressure before removing the structure from the mold.

EXAMPLE II

A bent beam structure is prepared by providing 33 groups of axial yarns of 9,011 total denier fiberglass yarns coated with thermoplastic polymer and 14 groups of braiding yarns of the same denier and composition as the axial yarns. The particular polymer used was that disclosed by Chang in U.S. Pat. No. 4,511,690. The axial yarn groups include 14 yarn ends in each of the 22 axial groups on the periphery of the structure and 15 yarn ends in each of the 11 axials on the inside of the structure. The braiding yarn groups each have 4 yarn ends. The braided structure is prepared using the pattern 94 shown in FIG. 12 by the two-step motion and pulled over a contoured surface similar to that shown in FIG. 1a. The braided structure is removed from the braiding apparatus and consolidated by placing the structure in a mold and first applying a mechanical pressure of 100 psi while heating to 290° C. After reaching 290° C. the mechanical pressure is increased to 1000 psi while heating at 290° C. to 300° C. for 15 minutes. The structure is cooled to room temperature in the mold while applying a mechanical pressure of 1000 psi.

We claim:

1. In a method for forming a braided structure that includes a multi-layer array of axial yarns extending longitudinally in the structure and braiding yarns by moving the braiding yarns towards and away from the outer periphery of the structure alternately in opposite directions in diagonal paths through the array in an interlacing pattern and interconnecting with other braiding yarns, the improvement comprising moving each of said braiding yarns in a first step in an interlacing pattern in said paths completely through the array to the outer periphery of the structure to reversal points before moving any of said braiding yarns in a second step in said paths in another diagonal direction from a reversal point.

2. In a braided structure including a multi-layer array of axial yarns extending longitudinally in the structure and braiding yarns which alternatively extend towards and away from the outer periphery of the structure in opposite directions in paths through the array in an interlacing pattern and interconnect with other braiding yarns, the improvement comprising a repeating two-step interlacing pattern wherein each of said braiding yarns extend in diagonal paths completely through the array to the outer periphery of the structure to a reversal point in one step of the pattern before any of said braiding yarns extend in a path in another diagonal direction from said reversal point to another reversal point in another step of the pattern.

3. The structure of claim 2 wherein said axial yarns and said braiding yarns are of continuous filaments impregnated with polymer.

4. The structure of claim 2, wherein said structure is impregnated with polymer.

5. The structure of claim 4, wherein said structure is a T-beam and the polymer is a thermosetting resin.

6. The structure of claim 3 or claim 4 wherein the polymer is thermosetting or thermoplastic, and the filaments are carbon, aramids or glass.

7. The structure of claims 3 or 4 wherein said structure has a curved section.

8. The structure of claims 3 or 4 wherein said structure incorporates structural voids therein.

9. The structure of claims 2, 3, or 4 wherein said structure changes in cross section along its length.

10. The method of claim 1, wherein said axial yarns and said braiding yarns are comprised of continous filaments impregnated with polymer.

11. The method of claim 10, wherein the polymer is either thermoplastic or thermosetting.

12. The method of claim 10 wherein said continuous filaments are either carbon or aramid or glass.

* * * * *